July 10, 1956 — J. WANKA — 2,754,480

TERMINATION CIRCUIT FOR TRANSMITTING ALL TYPES OF ELECTRICAL SIGNALS, PARTICULARLY IN TELEPHONE COMMUNICATIONS

Filed Feb. 23, 1955 — 4 Sheets-Sheet 1

Inventor
JOSEF WANKA

By Robert Harding Jr.
Attorney

Inventor
JOSEF WANKA
By Robert Harding Jr.
Attorney

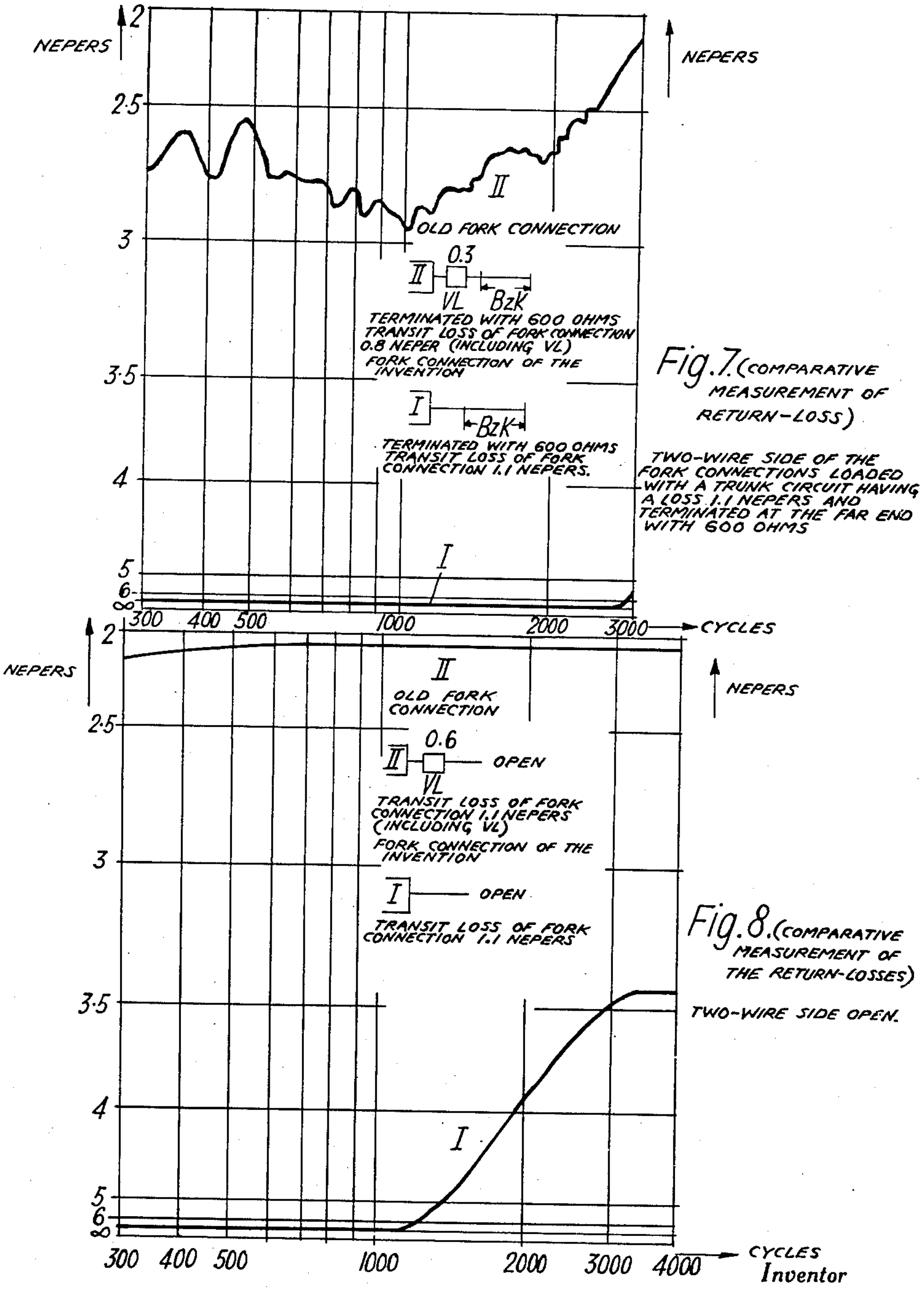
Fig. 7. (COMPARATIVE MEASUREMENT OF RETURN-LOSS), Fig. 8. (COMPARATIVE MEASUREMENT OF THE RETURN-LOSSES)
Inventor
JOSEF WANKA
By Robert Harding Jr.
Attorney July 10, 1956 J. WANKA 2,754,480

TERMINATION CIRCUIT FOR TRANSMITTING ALL TYPES OF ELECTRICAL SIGNALS, PARTICULARLY IN TELEPHONE COMMUNICATIONS

Filed Feb. 23, 1955 4 Sheets-Sheet 4

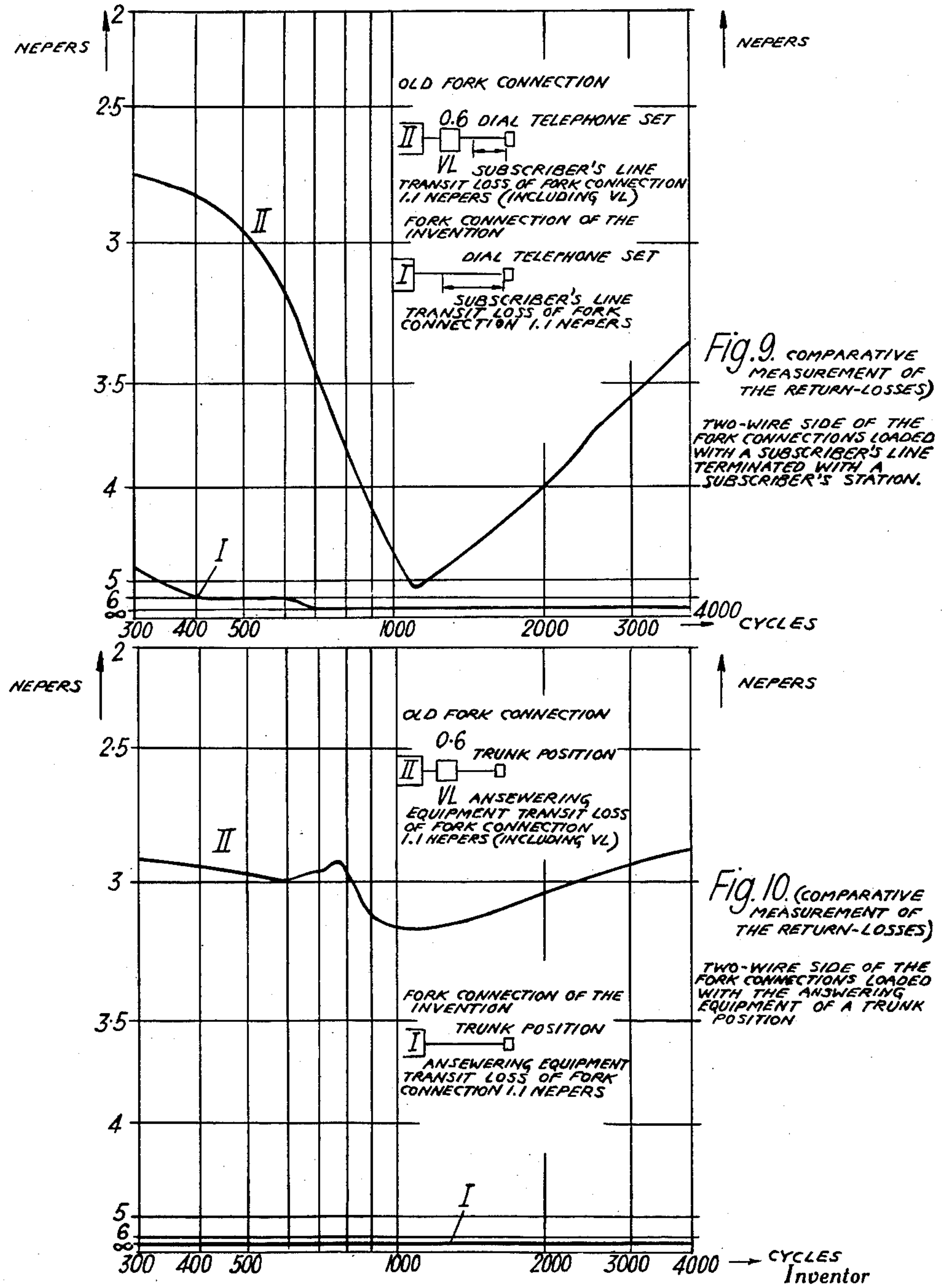

Fig. 9, Fig. 10

Fig. 9. COMPARATIVE MEASUREMENT OF THE RETURN-LOSSES)

TWO-WIRE SIDE OF THE FORK CONNECTIONS LOADED WITH A SUBSCRIBER'S LINE TERMINATED WITH A SUBSCRIBER'S STATION.

Fig. 10 (COMPARATIVE MEASUREMENT OF THE RETURN-LOSSES)

TWO-WIRE SIDE OF THE FORK CONNECTIONS LOADED WITH THE ANSWERING EQUIPMENT OF A TRUNK POSITION

Inventor
JOSEF WANKA

By Robert Harding Jr.
Attorney

United States Patent Office 2,754,480

Patented July 10, 1956

2,754,480

TERMINATION CIRCUIT FOR TRANSMITTING ALL TYPES OF ELECTRICAL SIGNALS, PARTICULARLY IN TELEPHONE COMMUNICATIONS

Josef Wanka, Vienna, Austria, assignor to International Telephone and Telegraph Corporation, New York, N. Y., a corporation of Maryland Application February 23, 1955, Serial No. 489,995

Claims priority, application Austria February 26, 1954

4 Claims. (Cl. 333—11)

The intermediate and terminal repeater circuits commonly in use, as well as the two-wire and four-wire circuits for transmitting reciprocal signals, particularly those used in telephone communication, all have the drawback of requiring differential transformers with an artificial balancing line at the junctions or electrical hybrid terminals of the two-wire circuit and the four-wire circuit called for by the unidirectional amplifying tubes. In practice, these artificial balancing lines are always imperfect and therefore it has never been possible to reduce the net loss of an amplified long-distance circuit below 0.6 neper.

Arrangements are known that attempt to circumvent these artificial balancing lines by using rectifier circuits. All these circuits, however, are either based on the known echo suppressor principle, or because of too high a distortion factor or too much transit loss, are of no practical significance.

The advantages of the present termination circuit over the above are the following:

1. The impedance of the two-wire circuit enters the bridge circuit symmetrically, thus preserving the balance of the bridge in the case of a broken or short-circuited line, and requiring, as artificial balancing line, simply an ohmic resistance dimensioned to approximate the impedance of the connected line.

2. Transit loss in both directions amounts to only about 1 neper, even though a terminal return-loss of at least 5 nepers is obtained with an ohmic resistance used as artificial balancing line between both branches of the four-wire circuit.

3. In contrast to other circuits, both half waves are sent and this keeps down the distortion factor.

4. All mass-produced fork connections may be inserted at all electrical hybrid terminals without special adaptation and all that has to be done to avoid matching errors is to see that the balancing resistance of the fork connection consisting only of an ohmic resistance coincides approximately with the impedance of the two-wire circuit.

Figure 1:
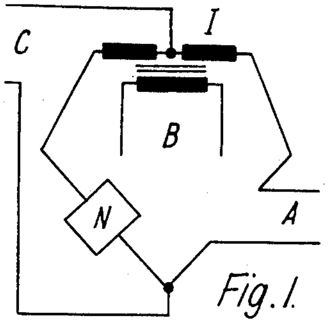
Figure 2:
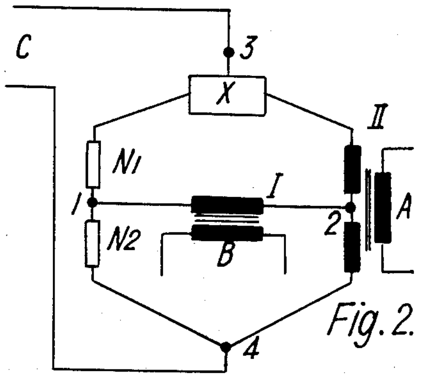
Figure 3:
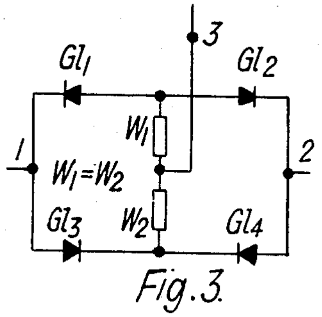
Figure 4:
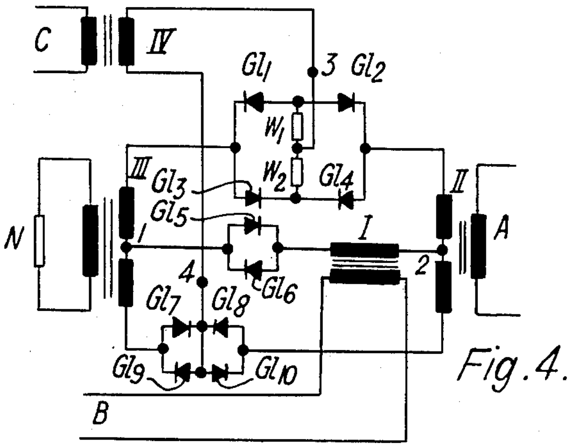
Figure 5:
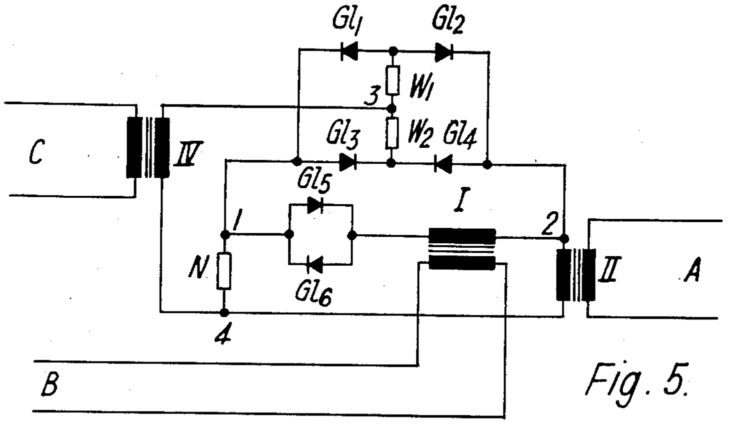
Figure 6:
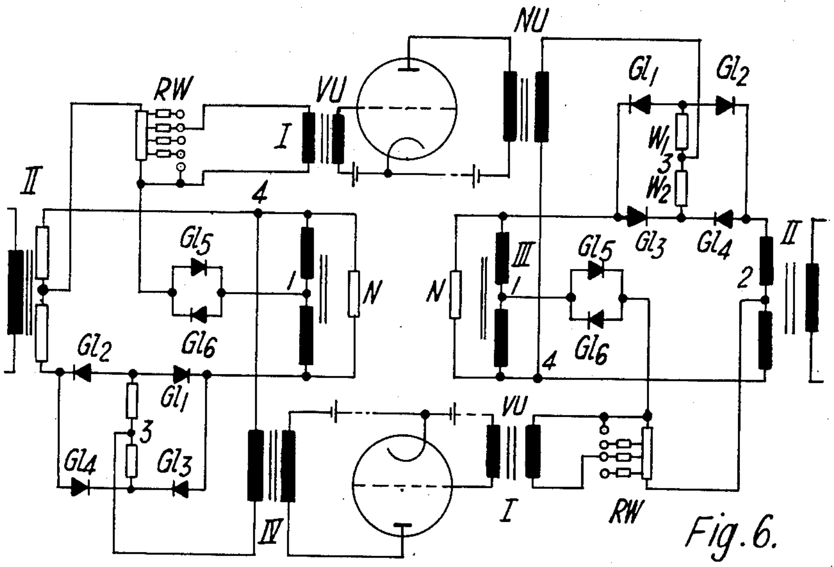

The drawing shows a few circuits by way of example. Fig. 1 outlines the principle of the termination circuit most commonly in use today and Fig. 2 shows the principle of the circuit in accordance with the invention. Fig. 3 shows an embodiment example of connecting device X, which is not described in detail in the basic circuit. Fig. 4 is an embodiment example of the new circuit when used with terminating four-wire circuits and Fig. 5 is an embodiment example of a simplified circuit. Fig. 6 is an embodiment example for a two-wire intermediate repeater without equalizer. Figs. 7, 8, 9 and 10 show the results of measuring the terminal return-loss of the first pilot model of the termination circuit in accordance with the invention as compared to the old termination circuit under identical operating conditions.

Fig. 1 shows the principle of the most commonly used termination circuit based on the known bridge principle. The two symmetrical half windings of transformer I form the upper arms of the bridge, while the line connected to A and its electrical balance form the lower arms of the bridge. Currents coming from C divide and flow across the right-hand arm of the bridge (formed by a half winding of transformer I and the line connected to A) and across the left-hand arm of the bridge (formed by the second half winding of transformer I and the line balance) back to C. If both bridge arm currents, flowing in opposite directions through the half windings of transformer I, are of the same magnitude, no current flows to B. However, this is the case only if the impedance of the line connected to A coincides exactly with that of the line balance, which in practice is never so.

A fairly good line balance can be provided in all cases where an electrically long line (with a 2 neper loss) having a homogeneous impedance path can be permanently assigned to the two-wire side (A) of the fork connection. Such cases are relatively rare in telephone networks because the impedance path, particularly when the wiring is old, is frequently wavy and because different lines must be connected to the two-wire side (A) of the fork connection in establishing calls. There are even cases in which no line at all is connected to the two-wire side. Therefore, for lines connected to switchboards, a uniform (average) balance must be used in place of the individual line balance. For this reason it was heretofore impossible to reduce loss in long-distance lines completely, since the terminal return-loss between the two arms of the four-wire circuit amounts to 2 nepers in the most unfavorable case (then a 0.6 neper loss component is inserted to stabilize the two-wire side), while the transit loss for each transmission direction amounts to 1.1 nepers, or a total of 2.2 nepers. Considering further that the entire return-loss cannot be utilized but must suffer a reduction of at least 0.4 neper to assure a stability capable of preventing certain oscillation of the four-wire circuit, there is a net loss of 0.6 neper as a result of the 2.2 neper transit loss (both directions), minus the 2 neper return-loss, plus a 0.4 neper stability.

Fig. 2 shows the simplified basic principle of the termination circuit in accordance with the invention, from which the difficulties shown in Fig. 1 have been eliminated, since the transit loss (both directions) is still no more than 2.2 nepers, whereas the return-loss for all frequencies in the transmitting range comes to at least 5 nepers. Again assuming a 0.4 neper stability, there results: 2.2 neper transit loss (both directions), minus 5 neper return-loss, plus 0.4 neper stability, equals a net loss of minus 2.4 nepers.

But since a negative loss is a gain, it may be seen that with the new termination circuit it is possible not only to reduce line loss completely but in addition to produce a significant gain.

In the new circuit in accordance with the invention the left-hand arm of the bridge is formed by two resistances $N_1$ and $N_2$ of like magnitude and the right-hand arm by two symmetrical half winding of transformer II. By means of this special arrangement the impedance of the line connected to A enters the bridge symmetrically, in which case it does not affect the balance of the bridge.

Further, as shown in Fig. 2, a connecting device X is inserted, making it possible to transmit from the two-wire circuit A to the outgoing four-wire circuit B. By means of this connecting device, shown for example in detail in Fig. 3, the following is accomplished:

1. The balance of the bridge remains intact in the transmission direction from the incoming four-wire circuit C to the two-wire circuit A, since only the low-resistance directional conductors $Gl_1$ to $Gl_4$ are located in the arms of the bridge.

2. However, resistances $W_1$ and $W_2$ become effective in the transmission direction from the two-wire circuit A to the outgoing four-wire circuit B, in which case a current flow develops, mainly in the lower portion of the bridge.

The circuit shown in Fig. 2 with the connecting device X of Fig. 3 has the following function. From the currents incoming in the transmission direction from the four-wire circuit from C to A, each time a half wave has passed resistance $W_1$ or $W_2$, two partial currents are formed, one flowing through the right-hand arm of the bridge and the other through the left-hand arm of the bridge. Actually, the current of a half wave passes across resistance $W_1$ and flows across the left-hand arm of the bridge formed by directional conductor $Gl_1$ and the two resistances of like magnitude $N_1$ and $N_2$ and across the right-hand arm of the bridge formed by directional conductor $Gl_2$ and the two symmetrical half windings of transformer II and then returns to C. On the other hand, the current of the second half wave flows across the left-hand arm of the bridge formed by resistances $N_1$ and $N_2$ and directional conductor $Gl_3$ and across the right-hand arm of the bridge formed by the two symmetrical half windings of transformer II and directional conductor $Gl_4$ and returns to C across resistance $W_2$. The bridge is independent of the two-wire circuit connected to A and is always in balance because the left-hand arm of the bridge consists of two resistances of like magnitude and the right-hand arm of the bridge consists of two symmetrical half windings of a transformer. Directional conductors $Gl_1$ to $Gl_4$ may be disregarded, because their forward resistance compared with the other bridge resistances is small.

The current coming from the two-wire circuit in the transmission direction from A to B flows through the primary winding of transformer II and energizes the two half windings of the secondary side in the same direction. Two circuits are formed.

A. The one half wave of the current comes:

1. From the lower half winding of transformer II and flows across transformer I and resistance $N_2$ back to said lower half winding;

2. From the upper winding of transformer II across directional conductor $Gl_4$ and resistance $W_2$, then divides and flows on the one hand across C and on the other across resistance $W_1$, directional conductor $Gl_1$ and resistances $N_1$ and $N_2$ to the lower half winding of transformer II.

B. The second half wave of the current comes:

1. From the lower half winding of transformer II and flows across resistance $N_2$ and transformer I back to said lower half winding;

2. From the lower half winding of transformer II across resistances $N_2$ and $N_1$, directional conductor $Gl_3$ and resistance $W_2$, on the one hand, and on the other across C and flows across resistance $W_1$ and directional conductor $Gl_2$ to the upper half winding of transformer II.

Fig. 4 shows an embodiment example of the new circuit to be used with terminating four-wire circuits. A few new connecting means have been introduced into this embodiment example, which do not change its basic function but only improve the quality of the termination circuit. Transit loss in the transmission direction from A to B is reduced by transformer III because instead of N/2 only N/4 becomes effective in the lower portion of the bridge in the circuit forming across transformer I. Transformer IV serves to match the impedance of the incoming four-wire circuit C with the impedance of the fork connection. Directional conductors $Gl_7$ to $Gl_{10}$ are simply a repetition of directional conductors $Gl_1$ to $Gl_4$ located in the upper portion of the bridge and serve to improve symmetry.

In accordance with the invention, only directional conductors $Gl_5$ and $Gl_6$ have the not-previously mentioned task of compensating the falling off of the return-loss at very low voltages (interference voltages) by an increase in transit-loss. Directional conductors $Gl_1$ to $Gl_4$, due to their characteristic curve, remain highly resistive at very low voltages (interference voltages) stemming from the four-wire circuit and disturb the balance of the bridge, in which case the return-loss drops. Directional conductors $Gl_5$ and $Gl_6$, however, have a voltage that has been further reduced by the bridge symmetry still present and are therefore more highly resistive than the former. Therefore, with a voltage difference occurring between points 1 and 2, only a fraction of the voltage is transmitted across transformer I to the outgoing four-wire circuit B.

Fig. 5 shows an embodiment example of a simplified circuit. It is based on the same principle as the basic circuit shown in Fig. 2 but here directional conductors $Gl_1$ to $Gl_4$ form the upper arms of the bridge and resistance N and transformer II form the lower arms. Assuming the resistance of directional conductors $Gl_1$ to $Gl_4$ to be zero or at least negligible with respect to resistance N and the impedance of the two-wire circuit effective across transformer II, there is approximate balance in the bridge.

Fig. 6 shows an embodiment example of the termination circuit for a simple two-wire intermediate repeater without equalizer. In this case, transformers I of the termination circuits may be designed as input transformers and transformers IV as output transformers. A repeater of this type requires, in addition to the two fork connections, only two more amplifying tubes and two variable condensers.

Figs. 7 to 10 show the results obtained in measuring the return-loss when operating the first pilot model of the termination circuit of the invention. However, it must be borne in mind that with this pilot model transformers with very imperfect symmetry on short circuit, and particularly at no-load, were used. This had an adverse effect, primarily on the result shown in Fig. 8.

Fig. 7 shows a comparison of the return-loss of a termination circuit in accordance with the invention with the return-loss of an old fork connection of uniform balance in operation. Both are connected to a two-wire circuit terminated at the far end with 600 ohms and having a 1.1 neper loss. Since the most unfavorable value of the entire frequency range determines return-loss, it may be seen that the old termination circuit (curve II) shows a return-loss of 2.1 nepers as compared with a return-loss of 5.8 nepers (curve I) of the termination circuit of the invention.

Fig. 8 shows a comparison of the return-loss of the same fork connections with open two-wire side. In this case the fork connection of the invention shows a return-loss of 3.4 nepers (curve I) as compared with 2.1 nepers (curve II) for the old fork connections. The reason for these poor values occurring at higher frequencies is to be found, as pointed out above, in the use of unsuitable transformers in the pilot model. Even in this case the return-loss of fork connections designed and manufactured in accordance with the invention will not fall below 5 nepers.

With regard to the comparative measurement shown in Fig. 9, the two-wire side of both fork connections is loaded with a subscriber's line terminating in a subscriber's set. The old fork connection shows a return-loss of 2.8 nepers (curve II) and the new fork connection a return-loss of 4.8 nepers (curve I).

In the case of the measurement values given in Fig. 10 both fork connections are terminated with the answering equipment of a trunk position. Here again, the return-loss of the old fork connection (curve II, 2.9 nepers) proves to be considerably less than that of the fork connection of the invention (curve I, over 6 nepers).

The present termination circuit is not limited to the fields of application mentioned but may be used, for example, in the fields of radio, television and telegraphy, wherever electrical signals are to be transmitted in both directions simultaneously over unidirectional connecting devices (tube amplifiers, for example).

I claim:

1. Termination circuit for transmission systems comprising a four-wire circuit and a two-wire circuit, first and second transformers, a bridge having points located in the incoming portion of said four-wire circuit and divided into two arms, one arm of which comprises two resistances of like magnitude, the total of the ohmic resistances used being equal to the impedance of the two-wire circuit multiplied by the resistance transformation ratio of said second transformer, while the other arm includes two symmetrical half windings of said second transformer, thus allowing the impedance of the two-wire circuit to enter the bridge circuit symmetrically, said first transformer being located between other points of said bridge, the outgoing direction of said four-wire circuit being connected to said last-mentioned points which, with respect to said first-mentioned bridge points are located at points of like potential, and further comprising a connecting device arranged in the upper arm of said bridge, said device comprising two parallel paths each including two oppositely poled unidirectional conducting devices, said parallel paths being joined by two resistances of like magnitude, one wire of said incoming four-wire circuit being connected to the junction of said two last-mentioned resistances.

2. Termination circuit according to claim 1 in which said two pairs of unidirectional conducting devices connected in parallel, are arranged in opposite directions across said other bridge points and are connected to said first transformer thus counteracting the decline in bridge balance at low voltages.

3. Termination circuit according to claim 1 further comprising a second connecting device similar to said last-mentioned connecting device arranged in the lower portion of the bridge circuit to effect a further improvement in bridge symmetry.

4. Termination circuit according to claim 1 in which said first transformer comprises a simple transformer connected in the lower arm of the bridge, whereby a single resistance also need only be used in the lower arm of the bridge.

No references cited.